US008967600B2

(12) United States Patent
Hede

(10) Patent No.: US 8,967,600 B2
(45) Date of Patent: Mar. 3, 2015

(54) SAFETY LANYARD AND MANUFACTURING METHOD THEREOF

(75) Inventor: Jean-Marc Hede, Domene (FR)

(73) Assignee: Zedel, Crolles (FR)

( * ) Notice: Subject to any disclaimer, the term of this patent is extended or adjusted under 35 U.S.C. 154(b) by 0 days.

(21) Appl. No.: 13/334,309

(22) Filed: Dec. 22, 2011

(65) Prior Publication Data

US 2012/0161376 A1 Jun. 28, 2012

(30) Foreign Application Priority Data

Dec. 22, 2010 (FR) ...................................... 10 05042

(51) Int. Cl.

| | |
|---|---|
| ***F16F 1/36*** | (2006.01) |
| ***D03D 3/00*** | (2006.01) |
| ***A62B 35/00*** | (2006.01) |
| ***D03D 3/02*** | (2006.01) |
| ***D03D 3/08*** | (2006.01) |
| ***D03D 11/02*** | (2006.01) |
| ***D03D 13/00*** | (2006.01) |
| ***D03D 15/08*** | (2006.01) |
| *A62B 35/04* | (2006.01) |

(52) U.S. Cl.

CPC ............ *D03D 3/005* (2013.01); *A62B 35/0075* (2013.01); *A62B 35/04* (2013.01); *D03D 3/02* (2013.01); *D03D 3/08* (2013.01); *D03D 11/02* (2013.01); *D03D 13/00* (2013.01); *D03D 15/08* (2013.01)

USPC .............. 267/148; 267/73; 182/3; 139/387 R; 139/384 R; 139/422; 428/36.1; 442/184; 442/203

(58) Field of Classification Search

CPC .... A62B 35/0075; A62B 35/04; D03D 11/02; D03D 13/00; D03D 15/08; D03D 3/005; D03D 3/02; D03D 3/08

USPC .......... 267/73, 67, 182, 148; 182/3; 428/36.1, 428/179, 181, 182; 442/182, 184, 203; 139/387 R, 384 R, 421, 422, 11

See application file for complete search history.

(56) References Cited

U.S. PATENT DOCUMENTS

| | | | | |
|---|---|---|---|---|
| 3,811,480 | A * | 5/1974 | Villiger et al. ............ | 139/384 R |
| 5,792,713 | A * | 8/1998 | Scari et al. .................... | 442/189 |
| 6,085,802 | A * | 7/2000 | Silberberg ................ | 139/387 R |
| 2005/0189169 | A1* | 9/2005 | Tanaka et al. ..................... | 182/3 |
| 2010/0093258 | A1* | 4/2010 | Glenn et al. .................... | 450/86 |

FOREIGN PATENT DOCUMENTS

| | | |
|---|---|---|
| DE | 26 37 593 A1 | 1/1978 |
| GB | 1 536 354 | 12/1978 |

* cited by examiner

*Primary Examiner* — Robert A Siconolfi
*Assistant Examiner* — Charles Poon
(74) *Attorney, Agent, or Firm* — Oliff PLC

(57) ABSTRACT

This lanyard, which is movable by elasticity between a rest position and a stretched position, comprises a tubular sheath made from non-stretchable material, and a set of elastic threads joined to the sheath.

According to the invention, the elastic threads define at least one longitudinal weaving zone in which they are woven on one surface of the sheath only, each weaving zone being proper to form a bending zone of the lanyard, in the rest position, in which the elastic threads are folded onto themselves.

7 Claims, 3 Drawing Sheets

SAFETY LANYARD AND MANUFACTURING METHOD THEREOF

BACKGROUND OF THE INVENTION

The invention relates to a safety lanyard, movable by elasticity between a rest position and a stretched position, comprising a tubular sheath made from non-stretchable material and a set of elastic threads secured to the sheath.

STATE OF THE ART

Lanyards formed by a flexible strip onto which a peripheral sheath is stitched are first of all known. In order to manufacture this first type of lanyards, the above-mentioned strip and sheath are first of all formed, in general by weaving, and this strip is then inserted in the stretched state into the sheath. These two elements are finally secured to one another by means of stitchings made at the two axial ends thereof. When the strip reverts to its rest state, it then deforms the sheath in the manner of a gusset.

It is also known to weave certain threads with the two surfaces of the sheath, along a few weft threads. This enables transverse linking lines to be created, arranged regularly along the sheath. When the traction force is eliminated, the flexible threads keep a rectilinear configuration, whereas the sheath forms a succession of bumps each of which connects two adjacent transverse lines.

These known lanyards do not prove to be totally satisfactory, in particular on account of their relatively low elongation rate. This rate, which corresponds to the ratio between the lengths respectively presented by the lanyard in the maximum stretched position and in the rest position, is a fundamental parameter of a lanyard. It is in fact conceived that a lanyard, a first end of which is in general secured to the roping point of a harness, advantageously has to present a length that is as variable as possible. When its other end is not secured, this lanyard therefore has to be as short as possible in the rest position to enable it to be easily grasped by the user. On the other hand, in particular when its other end is secured to an anchor, this lanyard has to be as long as possible in the stretched configuration to enable movement without blocking of the user.

OBJECT OF THE INVENTION

The above having been stipulated, the object of the invention is to provide a safety lanyard presenting a much higher elongation rate than that permitted in prior art solutions. A further object of the invention is to provide such a lanyard presenting a great strength and circumventing the use of a winding mechanism.

The lanyard according to the invention is remarkable in that the elastic threads define at least one longitudinal weaving zone in which they are woven on a single surface of the sheath, each weaving zone being proper to form a bending zone of the lanyard, in the rest position, in which the elastic threads are folded onto themselves.

Folding the elastic threads onto themselves so as to create bending zones enables the global space occupation of the lanyard in its rest position to be reduced. It can in fact easily be conceived that the total distance separating the two elements of this lanyard is then much smaller than the total length of the elastic threads. Under these conditions, the action of unfurling the lanyard enables this total distance to be considerably increased. Furthermore, this increase can be obtained without necessarily exerting a large tension on the lanyard, which is particularly favorable to its mechanical integrity and lifetime. Finally, the elastic nature of the threads enables the lanyard to be brought back naturally to its rest state, without using auxiliary equipment such as a winder.

It should be noted that, in comparison, the elastic threads of lanyards of the prior art present a globally rectilinear configuration both at rest and in the stretched position. In other words, the total space occupation of the lanyard at rest corresponds to the length of this elastic core. The possibility of elongation is consequently only permitted by the stretching capacity of the elastic threads, i.e. in general 100%. According to the invention on the other hand, the elongation can reach 500%, without however straining the elastic threads to the maximum.

The lanyard of the invention can comprise all or part of the following features, taken either alone or in any technically possible combination:

- each bending zone forms a circular sector at rest, the centre of the sector being located on the same side as the surface of the sheath, woven with the elastic threads,
- the axial dimension of each weaving zone with the elastic threads is greater than 3 cm, in particular close to 4 cm,
- the weaving zones with the elastic threads extend in alternate manner on one and then on the other of the surfaces of the sheath,
- each bending zone extends over at least one half-turn, in particular at an angle comprised between 180 and 270°, so that two junction lines between consecutive weaving zones are adjacent,
- the junction lines between consecutive weaving zones are aligned in the rest position along a longitudinal axis of the lanyard,
- the elastic threads are woven on one surface of the sheath only, so that the lanyard adopts the shape of a snail in the rest position,
- the longitudinal weaving zone(s) extend(s) over the majority, in particular over substantially the whole, of the axial dimension of the lanyard,
- the elastic threads form warp threads and, for a given weaving zone, these elastic threads represent between 5 and 20% of the whole of the warp threads.

The invention also relates to a method for manufacturing a lanyard as described in the foregoing in which the elastic threads are stretched, these stretched threads are woven with at least a first series of threads forming a first surface of the sheath, without weaving them with the threads of the opposite surface, so as to form at least one weaving zone, and the tension exerted on these elastic threads is released so that the or each weaving zone forms a bending zone of the lanyard.

BRIEF DESCRIPTION OF THE DRAWINGS

Other advantages and features will become more clearly apparent from the following description of an embodiment of the invention given for non-restrictive example purposes only and represented in the appended drawings in which.

DESCRIPTION OF A PREFERRED EMBODIMENT

The lanyard 1 according to the invention, represented in partial manner in FIGS. 1 to 4, comprises a tubular sheath 10, essentially made from non-stretchable material, and a set of elastic threads described in greater detail in the following. The two opposite surfaces of this sheath, which presents a flattened shape, bear the reference numbers 11 and 12. The non-stretchable material, which is for example high-strength polyamide or polyester, has a very low elongation rate under normal conditions of use of the lanyard. This capacity is much lower than that of the elastic material constituting the threads, i.e. for example an elastomer such as latex or Lycra™.

Figure 1:
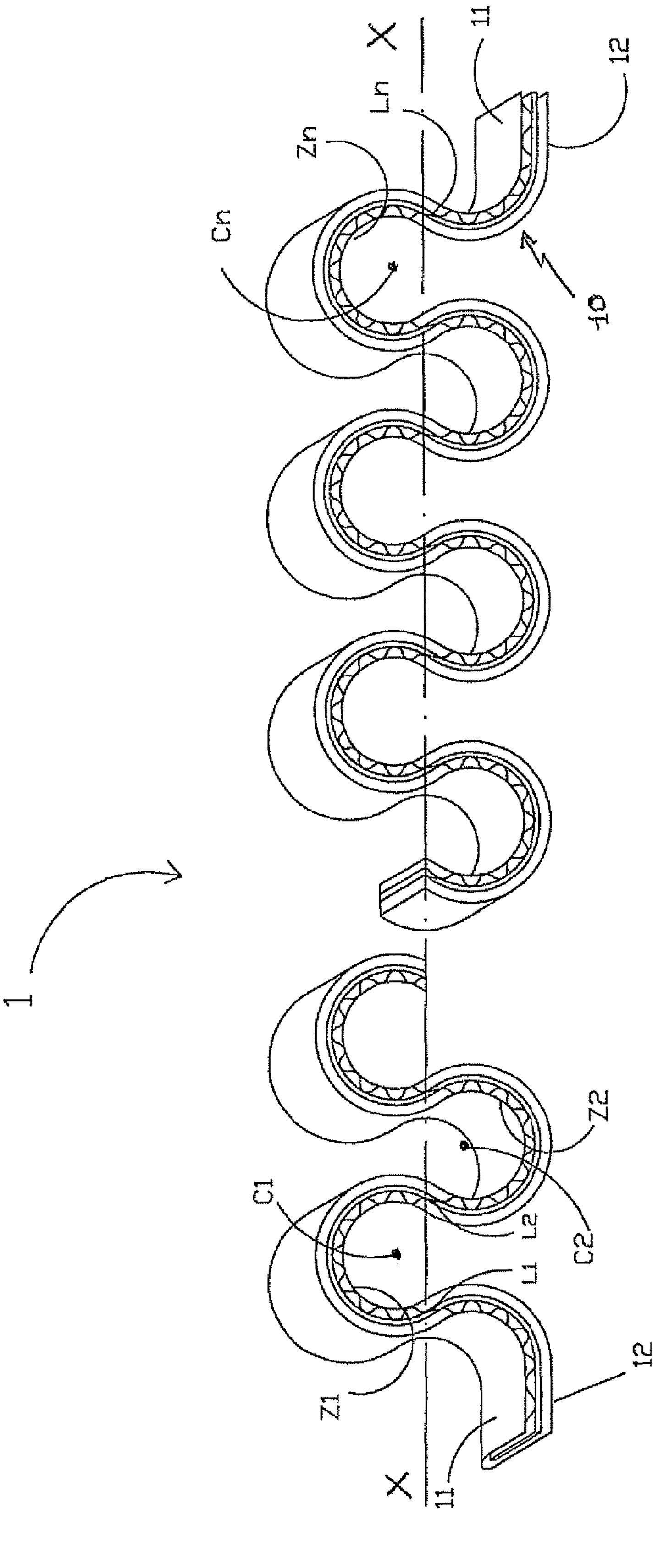
FIG. 1 is a perspective view of a lanyard according to the invention.
Figure 2:
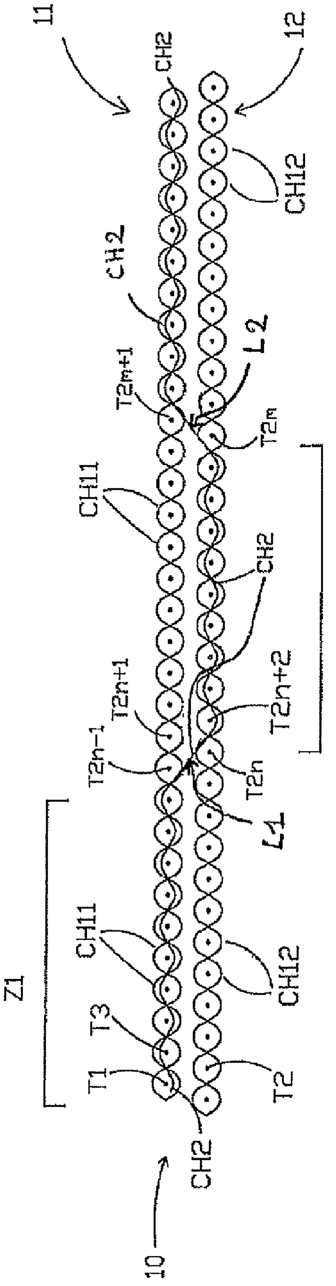
FIGS. 2 and 3 represent manufacture of the lanyard of FIG. 1 on an enlarged scale, from two different angles.
Figure 3:
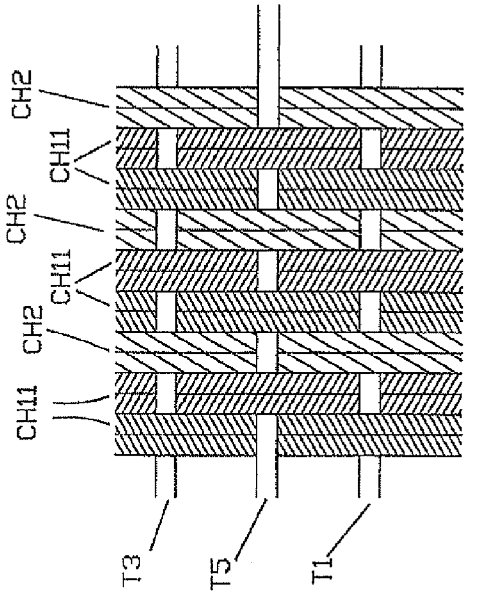

As shown in FIGS. 2 and 3, the sheath is woven from warp threads and weft threads. According to the invention, a majority of warp threads CH11 and CH12 made from non-stretchable material, designed to form the two surfaces 11 and 12, are first used. A certain proportion of elastic warp threads CH2, called link warp threads, are also used. This is more particularly visible in FIG. 3 which also illustrates weft threads T1, T3 and T5 of the first surface of the sheath.

The proportion of link threads CH2 compared with the whole set of warp threads used for a given surface, i.e. CH11+CH2, or CH12+CH2, is comprised between 5 and 20%. This range is relative to the number of elastic threads CH2, it being understood that the latter represent between 15 and 30% of the weight of the set of warp threads, as their transverse dimension is larger. The link threads are woven in stretched state with an elongation rate comprised between 50 and 100%, in particular close to 70%. Non-stretchable weft threads are moreover used, it being understood that recourse can be had to certain elastic threads, without this being decisive.

As shown in particular in FIG. 2, link warp threads CH2 are first of all woven only with weft threads T1, T3, . . . , T2*n*-1 of first surface 11 of the sheath, but on the other hand not with those T2, . . . , T2*n* of the other surfaces 12. A first securing zone by weaving Z1, called longitudinal as it extends along the main dimension of the lanyard, is thus to be found. These link threads CH2 are then woven only with weft threads T2*n*+2, . . . , T2*m* of the other surface 12 of the sheath, along a second longitudinal securing zone Z2, but not however with those T2*n*+1, . . . , T2*m*+1 of the first surface 11. In advantageous manner, each zone present an axial dimension, or length, of more than 3 cm (centimeters), and a typical length of 4 cm.

A succession of such zones are consequently to be found, placed in alternate manner on each side of the sheath. Along each zone, the link threads cooperate with a single given surface of the sheath, whereas they are independent from the other surface. In advantageous manner, these zones present substantially the same length. The different junction lines between two adjacent zones, corresponding to passage of the link threads from one surface of the core to the other bear the reference numbers L1, L2, . . . , Ln. In typical manner, a lanyard comprises between 15 and 30 successive securing zones, as described in the foregoing.

Figure 4:
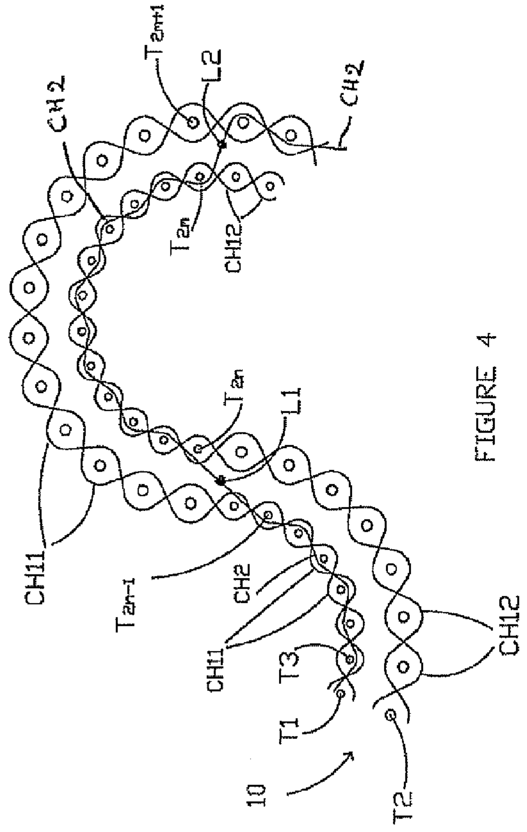
FIG. 4 represents the lanyard according to the invention in its rest position, in front view and on an enlarged scale.

On completion of weaving, when the tractive force is stopped, the elastic nature of the threads contributes to shortening the latter. Furthermore, the local link between the elastic threads and the sheath creates a withdrawal of the linked surface of the latter compared with its free surface. Consequently, the elastic threads tend to fold onto themselves. The successive securing zones Z1 to Zn then form bending zones of the lanyard, globally defining portions of circle the centres C1 to Cn of which are arranged in alternate manner on each side of the core. It is advantageous for these zones to extend over a majority or even appreciably the whole of the lanyard. It can in fact be conceived that such bending zones enable the volume of the lanyard at rest to be reduced to the same extent. FIG. 4 illustrates cooperation of the different warp and weft threads of FIG. 2 after the elastic threads have folded onto themselves.

In advantageous manner, each bending zone extends with an angle of slightly more than 180° so that two transverse junction lines are adjacent. This enables the global volume of the lanyard in its rest position to be reduced, as an additional measure. Furthermore, as seen in the foregoing, the securing zones are appreciably of the same length so that the junction lines are aligned. Under these conditions, the longitudinal axis of the lanyard passing via these different lines, in the rest position, is defined as X-X.

Figure 5:
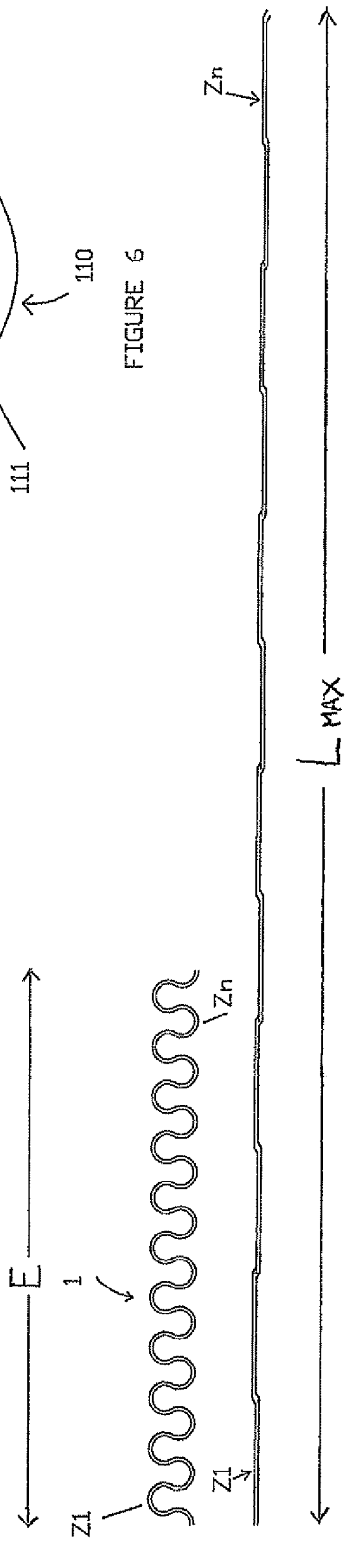
FIG. 5 is a schematic view showing the possibility of elongation of the lanyard according to the invention.

FIG. 5 represents the two functional positions of the lanyard, i.e. its rest position for which no force is exerted on this lanyard, and its maximum stretched position. In the rest position, the elastic threads are either relaxed or subjected to a slight residual strain. The total volume of the lanyard at rest, corresponding to the distance separating its two axial ends, is noted E. On account of the presence of numerous bending zones, it can be conceived that this volume is relatively small.

When the lanyard is unfurled, the elastic threads progressively stretch. On completion of this movement, these threads return more or less to their substantially rectilinear position corresponding to the position they occupy during weaving, as illustrated in FIG. 2. Under these conditions, the lanyard also adopts a rectilinear shape, and the distance between its two ends in this maximum extended position is noted Lmax. As shown in FIG. 5, the ratio between Lmax and E is much greater than 1, for example close to 5 or 6, which is to be compared with the prior art for which this ratio is in general close to 2.

Figure 6:
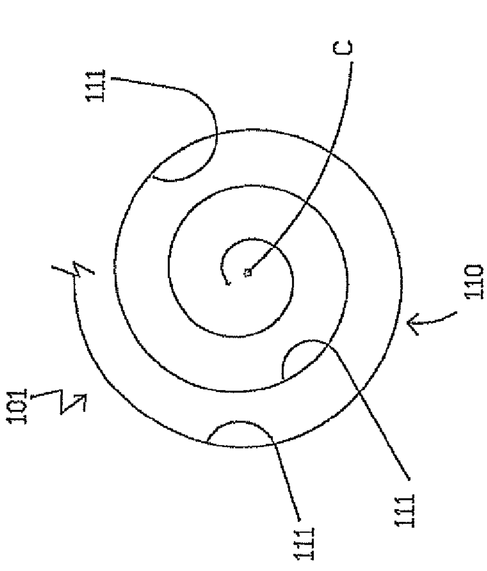
FIG. 6 illustrates an alternative embodiment of the lanyard according to the invention.

FIG. 6 is an alternative embodiment of lanyard 101 of the invention for which the elastic warp threads are woven on a single surface 111 of sheath 110, substantially over the whole of the latter. The weaving mode is then the same as that of the first embodiment illustrated in FIG. 2. When the tension on the elastic threads is released, on completion of this weaving, the threads fold onto themselves in the form of a snail, i.e. at all points they form a round the centre C of which is invariant.

The invention claimed is:

1. A safety lanyard, movable by elasticity between a rest position and a stretched position, the safety lanyard comprising:

a tubular sheath made from non-stretchable material and a set of elastic threads secured to the sheath, wherein:

the elastic threads define a plurality of longitudinal weaving zones in which they are woven along one surface of the sheath only, each weaving zone forms a bending zone of the lanyard, in the rest position, in which the elastic threads are folded onto themselves, each bending zone forms a circular sector at rest, the center of the sector being located on the same side as the surface of the sheath, woven with the elastic threads, and the weaving zones with the elastic threads extend in alternate manner on one and then on the other of the surfaces of the sheath.

2. The safety lanyard according to claim 1, wherein an axial dimension of each weaving zone with the elastic threads is greater than 3 cm, in particular close to 4 cm.

3. The safety lanyard according to claim 1, wherein each bending zone extends over at least one half-turn, in particular at an angle comprised between 180 and 270°, so that two junction lines between consecutive weaving zones are adjacent.

4. The safety lanyard according to claim 1, wherein junction lines between consecutive weaving zones are aligned in the rest position along a longitudinal axis of the lanyard.

5. The safety lanyard according to claim 1, wherein the longitudinal weaving zone(s) extend(s) over the majority, in particular over substantially the whole, of an axial dimension of the lanyard.

6. The safety lanyard according to claim 1, wherein the elastic threads form warp threads and, for a given weaving zone, these elastic threads represent between 5 and 20% of the whole of the warp threads.

7. A method for manufacturing a lanyard according to claim 1, wherein the elastic threads are stretched, these stretched threads are woven with at least a first series of threads forming a first surface of the sheath, without weaving them with the threads of the opposite surface, so as to form at least one weaving zone, and the tension exerted on these elastic threads is released so that the or each weaving zone forms the bending zone of the lanyard.

* * * * *